United States Patent
Nagayama et al.

(10) Patent No.: US 12,435,206 B2
(45) Date of Patent: Oct. 7, 2025

(54) RESIN COMPOSITION, ADHESIVE MEMBER, AND DISPLAY DEVICE INCLUDING THE SAME

(71) Applicant: Samsung Display Co., Ltd., Yongin-si (KR)

(72) Inventors: Shintaro Nagayama, Yokohama (JP); Hideo Umeda, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 802 days.

(21) Appl. No.: 17/698,454

(22) Filed: Mar. 18, 2022

(65) Prior Publication Data
US 2022/0300103 A1 Sep. 22, 2022

Related U.S. Application Data

(63) Continuation-in-part of application No. 17/581,190, filed on Jan. 21, 2022, now abandoned.

(30) Foreign Application Priority Data

Mar. 19, 2021 (KR) .................. 10-2021-0035933
Mar. 14, 2022 (KR) .................. 10-2022-0031541

(51) Int. Cl.
| | | |
|---|---|---|
| C08F 2/46 | (2006.01) | |
| C08F 2/50 | (2006.01) | |
| C08F 220/68 | (2006.01) | |
| C08G 61/04 | (2006.01) | |
| C08K 5/378 | (2006.01) | |
| C08K 5/52 | (2006.01) | |
| C08K 5/526 | (2006.01) | |
| C09J 4/00 | (2006.01) | |
| C09J 11/06 | (2006.01) | |
| C09J 133/14 | (2006.01) | |
| G06F 3/041 | (2006.01) | |
| G06F 3/044 | (2006.01) | |
| H10K 50/844 | (2023.01) | |
| H10K 50/86 | (2023.01) | |
| H10K 59/40 | (2023.01) | |
| H10K 77/10 | (2023.01) | |
| H10K 59/80 | (2023.01) | |
| H10K 102/00 | (2023.01) | |

(52) U.S. Cl.
CPC ............ *C08K 5/526* (2013.01); *C08F 220/68* (2013.01); *C08K 5/378* (2013.01); *C08K 5/52* (2013.01); *C09J 4/00* (2013.01); *C09J 11/06* (2013.01); *C09J 133/14* (2013.01); *G06F 3/0412* (2013.01); *G06F 3/044* (2013.01); *H10K 50/844* (2023.02); *H10K 50/86* (2023.02); *H10K 59/40* (2023.02); *H10K 77/111* (2023.02); *H10K 59/873* (2023.02); *H10K 2102/311* (2023.02)

(58) Field of Classification Search
CPC .. C09J 133/14; C09J 4/00; C09J 11/06; C08F 220/68; C08F 220/282; C08F 220/1808; C08F 220/1811; C08F 220/20; C08F 220/1065; C08F 220/1804; C08F 222/1065; C08K 5/524; C08K 5/526; C08K 5/51; C08K 5/378; C08L 33/06; H10K 77/111; H10K 50/86; H10K 50/844; H10K 50/873; H10K 59/40; H10K 2102/311; G06F 3/0412; G06F 3/044
USPC ........................... 522/100, 1; 520/1
See application file for complete search history.

(56) References Cited

U.S. PATENT DOCUMENTS

| | | | |
|---|---|---|---|
| 6,486,225 B1 * | 11/2002 | Kamata ............. | C09D 175/16 |
| | | | 524/718 |
| 9,809,729 B2 | 11/2017 | Yasui et al. | |
| 2017/0335144 A1 | 11/2017 | Mitsui et al. | |
| 2018/0163075 A1 * | 6/2018 | Ren ................. | C08L 75/14 |

FOREIGN PATENT DOCUMENTS

| | | |
|---|---|---|
| JP | 9-286808 | 11/1997 |
| JP | 5961201 | 8/2016 |
| JP | 2017-210578 | 11/2017 |
| KR | 10-2014-0148290 | 12/2014 |
| KR | 10-2017-0104378 | 9/2017 |
| KR | 10-1927012 | 12/2018 |

OTHER PUBLICATIONS

Branislav Husáet al., "The formulator's guide to anti-oxygen inhibition additives", Progress in Organic Coatings, Jul. 16, 2014, pp. 1789-1798, vol. 77.

* cited by examiner

Primary Examiner — Jessica Whiteley

(57) ABSTRACT

A resin composition includes a (meth)acrylate oligomer, and an oxygen inhibition preventing agent including at least one of a phosphite compound having a boiling point of about 150° C. or higher, and a phosphine compound having a boiling point of about 150° C. or higher, wherein the oxygen inhibition preventing agent is included in an amount of about 0.1 wt % or more and less than about 1 wt % with respect to a total amount of a (meth)acrylate. An adhesive member formed by photocuring the resin composition exhibits excellent adhesion at high temperatures, and may thus exhibit excellent reliability in case used in a flexible display device.

6 Claims, 10 Drawing Sheets

RESIN COMPOSITION, ADHESIVE MEMBER, AND DISPLAY DEVICE INCLUDING THE SAME

CROSS-REFERENCE TO RELATED APPLICATION(S)

This is a continuation-in-part application of U.S. patent application Ser. No. 17/581,190, filed Jan. 21, 2022, the disclosure of which is incorporated herein by reference in its entirety. U.S. patent application Ser. No. 17/581,190 claims priority to and benefit of Korean Patent Application Nos. 10-2021-0035933 and 10-2022-0031541 under 35 U.S.C. § 119, filed on Mar. 19, 2021 and Mar. 14, 2022, respectively, in the Korean Intellectual Property Office, the entire contents of which are incorporated herein by reference.

BACKGROUND

1. Technical Field

The disclosure herein relates to a resin composition, an adhesive member formed of the resin composition, and a display device including the adhesive member.

2. Description of the Related Art

Various display devices used in multimedia devices such as televisions, mobile phones, tablet computers, navigation systems, and game consoles have been developed. In particular, a display device is recently being developed, which may include a flexible display member to be bendable and may be foldable, bendable or rollable to facilitate portability and improve user convenience.

In such a flexible display device, it is desirable to secure reliability in a folding or bending operation of each member being used. An adhesive resin used to form an adhesive layer to be applied to display devices having various shapes should have excellent coating characteristics for members of display devices having various shapes.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a resin composition that may have high adhesion at high temperature and an adhesive member manufactured therefrom.

The disclosure also provides a display device having an excellent reliability.

An embodiment of the disclosure provides a resin composition that may include a (meth)acrylate oligomer, and an oxygen inhibition preventing agent having at least one of a phosphite compound having a boiling point of about 150° C. or higher and a phosphine compound having a boiling point of about 150° C. or higher, wherein the oxygen inhibition preventing agent may be included in an amount of about 0.1 wt % or more and less than about 1 wt % with respect to the total amount of a (meth)acrylate.

In an embodiment, the oxygen inhibition preventing agent may include at least one of triphenyl phosphite, tricresyl phosphite, triethyl phosphite, and triphenyl phosphine.

In an embodiment, the resin composition may further include a (meth)acrylate monomer.

In an embodiment, the resin composition may further include a monofunctional (meth)acrylate monomer.

In an embodiment, the resin composition may further include a polyfunctional (meth)acrylate monomer in case that an amount of the monofunctional (meth)acrylate monomer is about 80 wt % or more with respect to the total amount of (meth)acrylate.

In an embodiment, an amount of the oxygen inhibition preventing agent may be less than about 0.5 wt % with respect to the total amount of the (meth)acrylate.

In an embodiment, the resin composition may further include a thiol compound, and an amine compound.

In an embodiment, the (meth)acrylate may be a urethane (meth)acrylate.

In an embodiment of the disclosure, an adhesive member may include a polymer derived from a resin composition including a (meth)acrylate oligomer, and an oxygen inhibition preventing agent including at least one of a phosphite compound having a boiling point of about 150° C. or higher, and a phosphine compound having a boiling point of about 150° C. or higher, wherein the resin composition may include the oxygen inhibition preventing agent in an amount of about 0.1 wt % or more and less than about 1 wt % with respect to the total amount of a (meth)acrylate.

In an embodiment, the oxygen inhibition preventing agent may include at least one of triphenyl phosphite, tricresyl phosphite, triethyl phosphite, and triphenyl phosphine.

In an embodiment, the resin composition may further include a (meth)acrylate monomer.

In an embodiment, the resin composition may further include a monofunctional (meth)acrylate monomer.

In an embodiment, the resin composition may further include a polyfunctional (meth)acrylate monomer in case that an amount of the monofunctional (meth)acrylate monomer may be about 80 wt % or more with respect to the total amount of (meth)acrylate.

In an embodiment of the disclosure, a display device may include a display panel, a window disposed on the display panel, and an adhesive member disposed between the display panel and the window, wherein the adhesive member includes a polymer derived from a resin composition including a (meth)acrylate oligomer, and an oxygen inhibition preventing agent including at least one of a phosphite compound having a boiling point of about 150° C. or higher, and a phosphine compound having a boiling point of about 150° C. or higher, and the resin composition includes the oxygen inhibition preventing agent in an amount of about 0.1 wt % or more and less than about 1 wt % with respect to the total amount of a (meth)acrylate.

In an embodiment, the adhesive member may have a thickness of about 50 μm to about 200 μm.

In an embodiment, a display device may further include an input sensor disposed on the display panel, wherein the adhesive member may be disposed between the display panel and the input sensor or between the input sensor and the window.

In an embodiment, the display panel may include a display element layer and an encapsulation layer disposed on the display element layer, wherein the input sensor may be directly disposed on the encapsulation layer, and the adhesive member may be disposed on the input sensor.

In an embodiment, the adhesive member may be formed by directly providing the resin composition on a surface of the window or on a surface of the display panel, and performing UV curing on the provided resin composition.

In an embodiment, the display device may further include at least one folding region, wherein the at least one folding region has a radius of curvature of about 5 mm or less.

In an embodiment, the display device may further include a light control layer disposed between the adhesive member and the window, and an optical adhesive layer disposed between the light control layer and the window, wherein the optical adhesive layer may include the polymer derived from the resin composition.

BRIEF DESCRIPTION OF THE FIGURES

The accompanying drawings are included to provide a further understanding of the disclosure, and are incorporated in and constitute a part of this specification. The drawings illustrate embodiments of the disclosure and, together with the description, serve to explain principles of the disclosure. In the drawings.

DETAILED DESCRIPTION OF THE EMBODIMENTS

Figure 1:
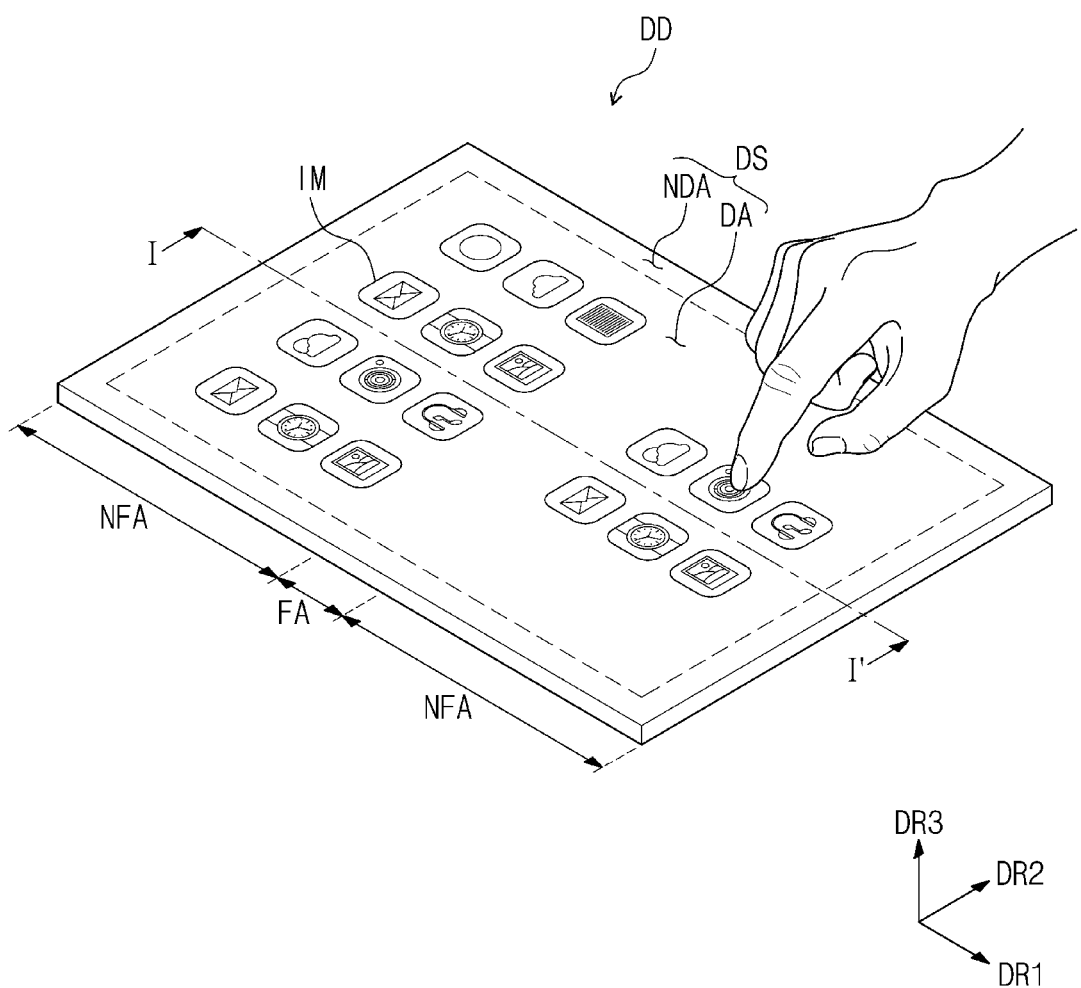
FIG. 1 is a schematic perspective view of a display device according to an embodiment.

The disclosure may be implemented in various modifications and have various forms and specific embodiments are illustrated in the drawings and described in detail in the text. It is to be understood, however, that the disclosure is not intended to be limited to the particular forms disclosed, but on the contrary, is intended to cover all modifications, equivalents, and alternatives falling within the spirit and scope of the disclosure.

In this specification, it will be understood that when an element or layer is referred to as being "on", "connected to" or "coupled to" another element or layer, it can be directly on, connected or coupled to the other element or layer or intervening elements or layers may be present.

On the other hand, in the application, "directly disposed" means that there may be no layer, film, region, plate, or the like added between the portion of the layer, film, region. For example, "directly disposed" may mean disposing without additional members such as adhesive members between two layers or two members.

It will be understood that the terms "connected to" or "coupled to" may include a physical or electrical connection or coupling.

Like reference numerals refer to like elements throughout. The thickness and the ratio and the dimension of elements may be exaggerated for the effective description of the technical contents.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, and the like may be used herein to describe various components, these components should not be limited by these terms. These terms are only used to distinguish one component from another component. Thus, a first component discussed below could be termed a second component without departing from the teachings of the disclosure, and similarly, the second component could also be termed to as the first component. As used herein, the singular forms are intended to include the plural forms as well (and vice versa), unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. The terms may be relative concepts and are described based on the directions indicated in the drawings. In this specification, the term "below" can encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "comprises", "includes", "has", and the like specify the presence of stated features, integers, steps, operations, elements, and/or components, but do not preclude the presence or addition of one or more other features, integers, steps, operations, elements, components, and/or groups thereof.

"About", "approximately", "substantially", and the like as used herein are inclusive of the stated value and mean within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Hereinafter, a resin composition, an adhesive member, and a display device according to embodiments of the disclosure will be described with reference to the accompanying drawings.

Figure 2:
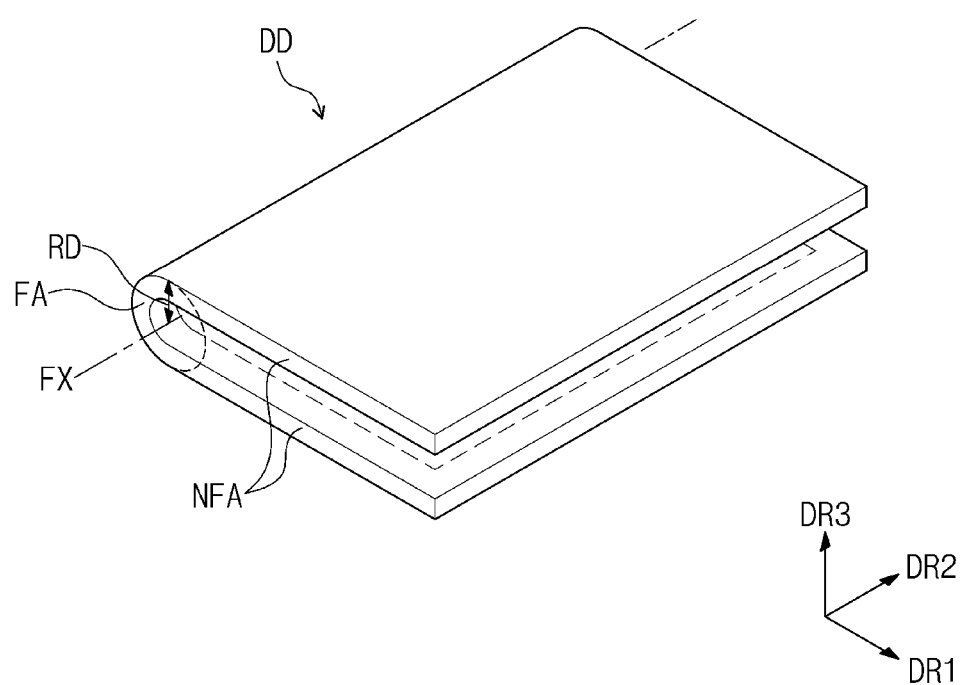
FIG. 2 is a schematic diagram illustrating a folded state of the display device illustrated in FIG. 1.

FIG. 1 is a schematic perspective view of a display device according to an embodiment. FIG. 2 is a schematic diagram illustrating a folded state of the display device illustrated in FIG. 1.

Referring to FIG. 1, a display device DD according to an embodiment may have a rectangular shape having long sides extending in a first direction DR1, and short sides extending in a second direction DR2 intersecting the first direction DR1. However, embodiments of the disclosure are not limited thereto, and the display device DD may have various shapes such as a circular shape and a polygonal shape on a plane. The display device DD may be a flexible display device.

In the display device DD according to an embodiment, a display surface DS on which an image IM may be displayed may be parallel to a plane defined by the first direction DR1 and the second direction DR2. A third direction DR3 indicates the normal direction of the display surface DS, for example, a thickness direction of the display device DD. The front surface (or upper surface) and the rear surface (or lower surface) of each member may be defined by the third direction DR3. However, the directions indicated by the first to third directions DR1, DR2, and DR3 may be relative concepts and may thus be changed to other directions. Hereinafter, the first to third directions are respectively indicated by the first to third directions DR1, DR2, and DR3, and are thus denoted by the same reference numerals.

The display device DD according to an embodiment may include at least one folding region FA. Referring to FIGS. 1 and 2, the display device DD may include a folding region FA and non-folding regions NFA. The folding region FA may be disposed between the non-folding regions NFA, and the folding region FA and the non-folding regions NFA may be arranged adjacent to each other in the first direction DR1.

The folding region FA may be a part deformable into a shape folded with respect to a folding axis FX extending in the second direction DR2 which may be one direction. The radius of curvature RD of the folding region FA may be about 5 mm or less.

FIGS. 1 and 2 illustrate one folding region FA and two non-folding regions NFA, but number of folding regions FA and number of non-folding regions NFA are not limited thereto. For example, the display device DD may include more than two non-folding regions NFA and folding regions FA disposed between the non-folding regions NFA.

In the display device DD according to an embodiment, the non-folding regions NFA may be disposed to be symmetrical to each other with respect to the folding region FA. However, embodiments of the disclosure are not limited thereto. The folding region FA may be disposed between the non-folding regions NFA such that areas of the two non-folding regions NFA facing each other with the folding region FA therebetween may be different from each other.

The display surface DS of the display device DD may include a display region DA and a non-display region NDA around the display region DA. The display region DA may display an image, and the non-display region NDA may not display an image. The non-display region NDA may surround the display region DA and may define the border of the display device DD.

Referring to FIG. 2, the display device DD may be a bendable (e.g., foldable) display device DD that may be folded or unfolded. For example, the folding region FA may be bent with respect to the folding axis FX parallel to the second direction DR2, so that the display device DD may be folded. The folding axis FX may be defined as a short axis parallel to the short side of the display device DD.

In case that the display device DD is folded, the non-folding regions NFA may face each other, and the display device DD may be in-folded so that the display surface DS may not be exposed to the outside. However, embodiments of the disclosure are not limited thereto. Unlike the illustration in the drawing, the display device DD may be out-folded so that the display surface DS may be exposed to the outside.

Figure 3:
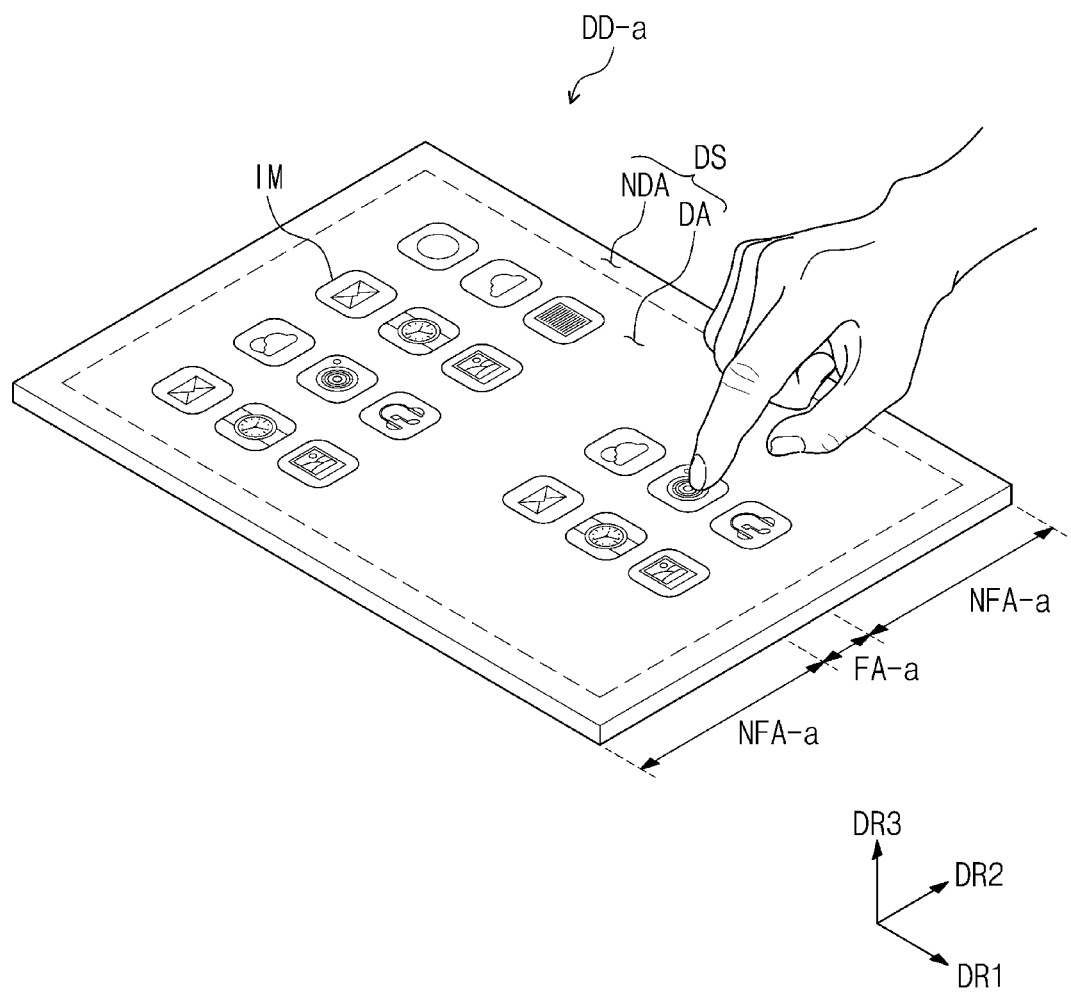
FIG. 3 is a schematic perspective view of a display device according to an embodiment.
Figure 4:
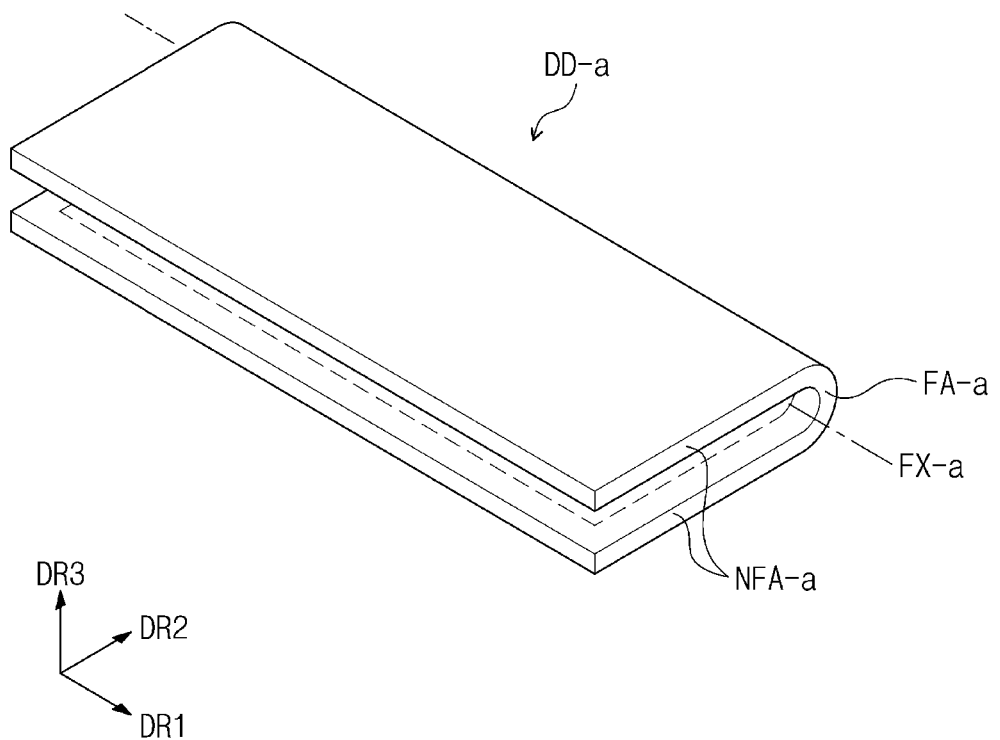
FIG. 4 is a schematic diagram illustrating a folded state of the display device illustrated in FIG. 3.

FIG. 3 is a schematic perspective view of a display device according to an embodiment. FIG. 4 is a schematic diagram illustrating a folded state of the display device illustrated in FIG. 3.

Except for the folding operation, a display device DD-a illustrated in FIG. 3 may have substantially the same configuration as the display device DD illustrated in FIG. 1. Accordingly, the following description of the display device DD-a illustrated in FIGS. 3 and 4 will be focused on a folding operation.

Referring to FIGS. 3 and 4, the display device DD-a may include a folding region FA-a and non-folding regions NFA-a. The folding region FA-a may be disposed between the non-folding regions NFA-a, and the folding region FA-a and the non-folding regions NFA-a may be arranged adjacent to each other in the second direction DR2.

The folding region FA-a may be bent with respect to the folding axis FX-a parallel to the first direction DR1, so that the display device DD-a may be folded. The folding axis FX-a may be defined as a long axis parallel to the long side of the display device DD-a. The display device DD illustrated in FIG. 1 may be folded with respect to the short axis, but, on the contrary, the display device DD-a illustrated in FIG. 3 may be folded with respect to the long axis. FIG. 4 illustrates that the display device DD-a may be in-folded so that the display surface DS may not be exposed to the outside. However, embodiments of the disclosure are not limited thereto, and the display device DD-a may be folded with respect to the long axis and out-folded.

Figure 5:
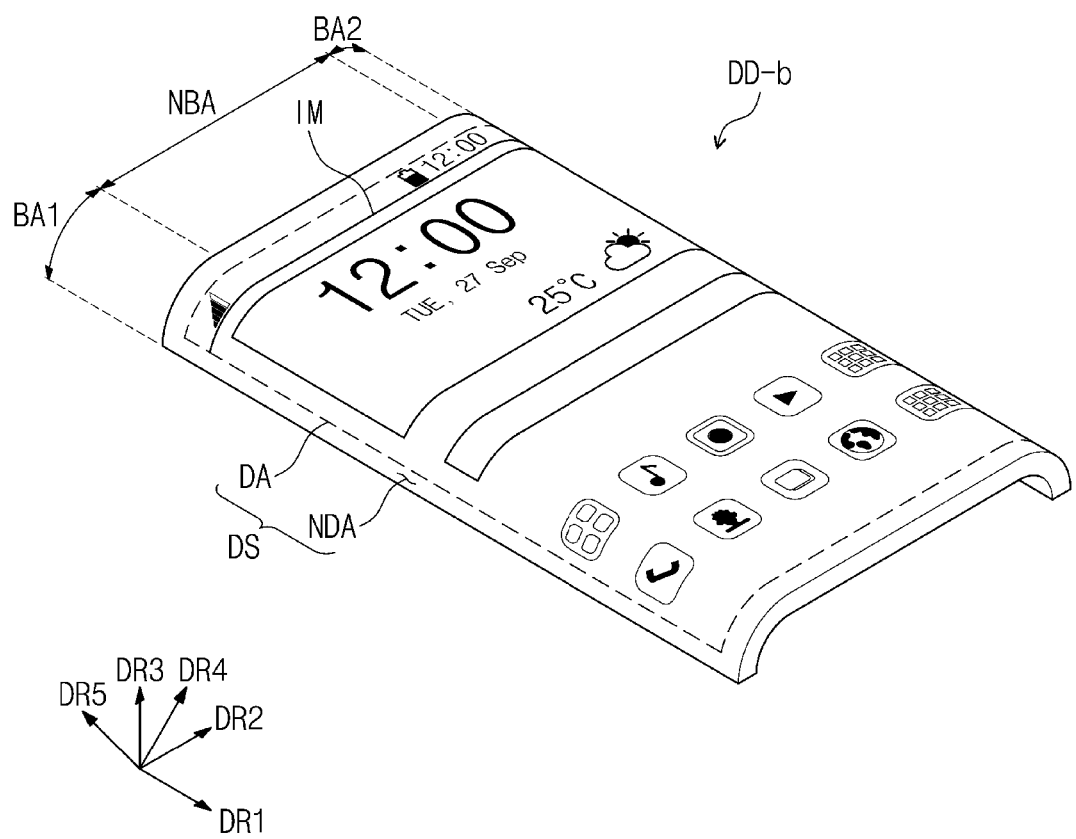
FIG. 5 is a schematic perspective view of a display device according to an embodiment.

FIG. 5 is a schematic perspective view of a display device according to an embodiment. A display device DD-b according to an embodiment may include bending regions BA1 and BA2 and a non-bending region NBA, and the bending regions BA1 and BA2 may be bent from sides of the non-bending region NBA.

Referring to FIG. 5, the display device DD-b according to an embodiment may include non-bending region NBA in which the image IM may be displayed on a front surface, and a first bending region BA1 and a second bending region BA2 in which the image IM may be displayed on side surfaces. The first bending region BA1 and the second bending region BA2 may be respectively bent from both sides of the non-bending region NBA.

Referring to FIG. 5, in the non-bending region NBA, the image IM may be provided in the third direction DR3, for example, provided on the front surface of the display device DD-b. In the first bending region BA1, the image may be provided in a fifth direction DR5, and in the second bending region BA2, the image may be provided in a fourth direction DR4. The fourth direction DR4 and the fifth direction DR5 may intersect the first to third directions DR1, DR2, and DR3. However, the directions indicated by the first to fifth directions DR1 to DR5 may be relative concepts and are not limited to the directional relationship illustrated in the drawings.

The display device DD-b according to an embodiment may be a bendable display device including the non-bending region NBA and the bending regions BA1 and BA2 respectively disposed on both sides of the non-bending region NBA. Although not illustrated, the display device according to an embodiment may be a bendable display device including one non-bending region and one bending region. The bending region may be provided by being bent only at a side of the non-bending region.

In FIGS. 1 to 5 described above, a foldable display device and a bendable display device are illustrated and described, but embodiments of the disclosure are not limited thereto. The display device according to an embodiment may be a rollable display device, a flat rigid display device, or a curved rigid display device.

Hereinafter, a display device according to an embodiment will be described with reference to the display device DD that may be folded with respect to the short axis, but embodiments of the disclosure are not limited thereto. Thus, the following description may also be applied to various types of display devices as well as the display device DD-a folded with respect to the long axis, and the display device DD-b including the bending region.

Figure 6:
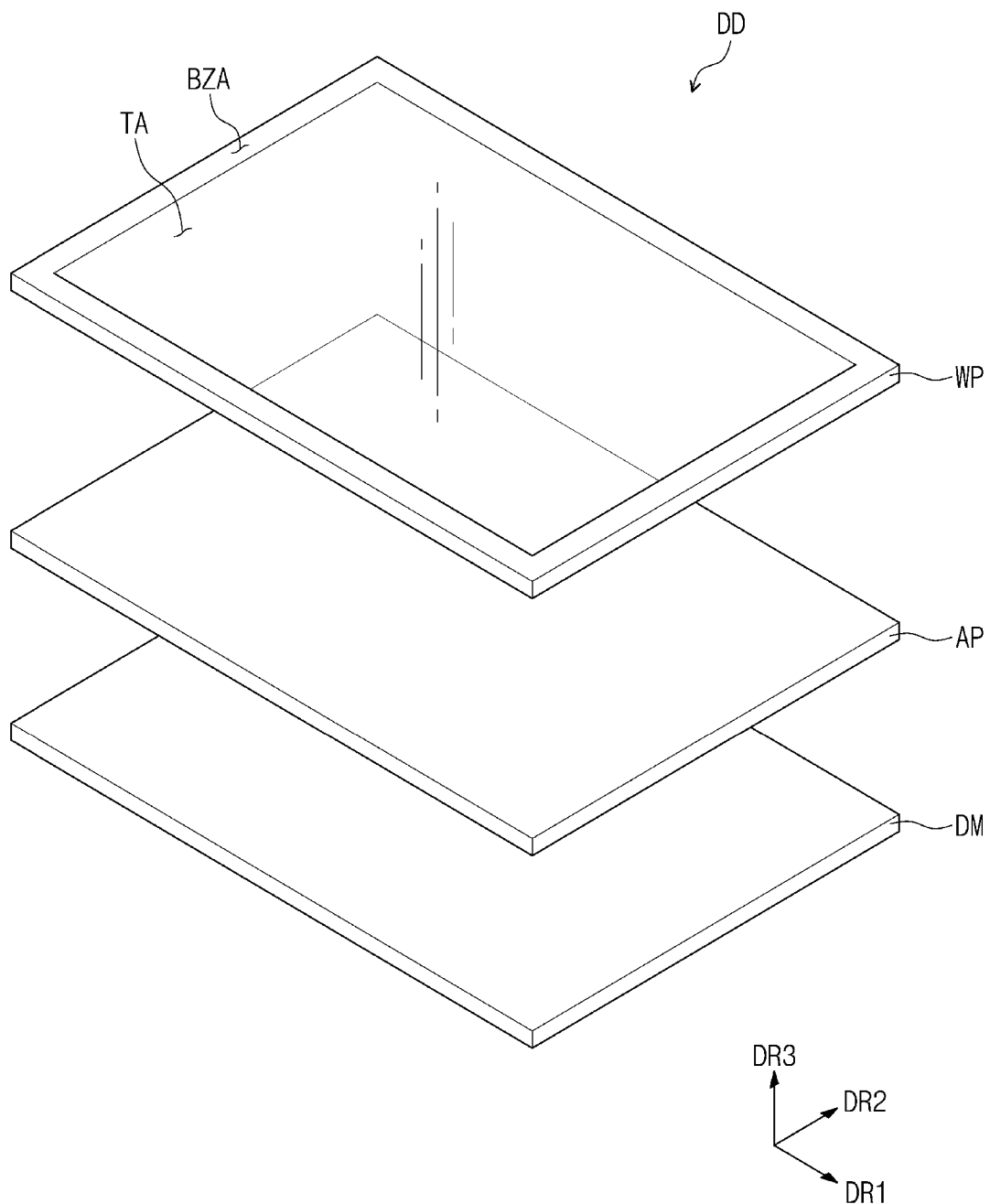
FIG. 6 is an exploded schematic perspective view of a display device according to an embodiment.
Figure 7:
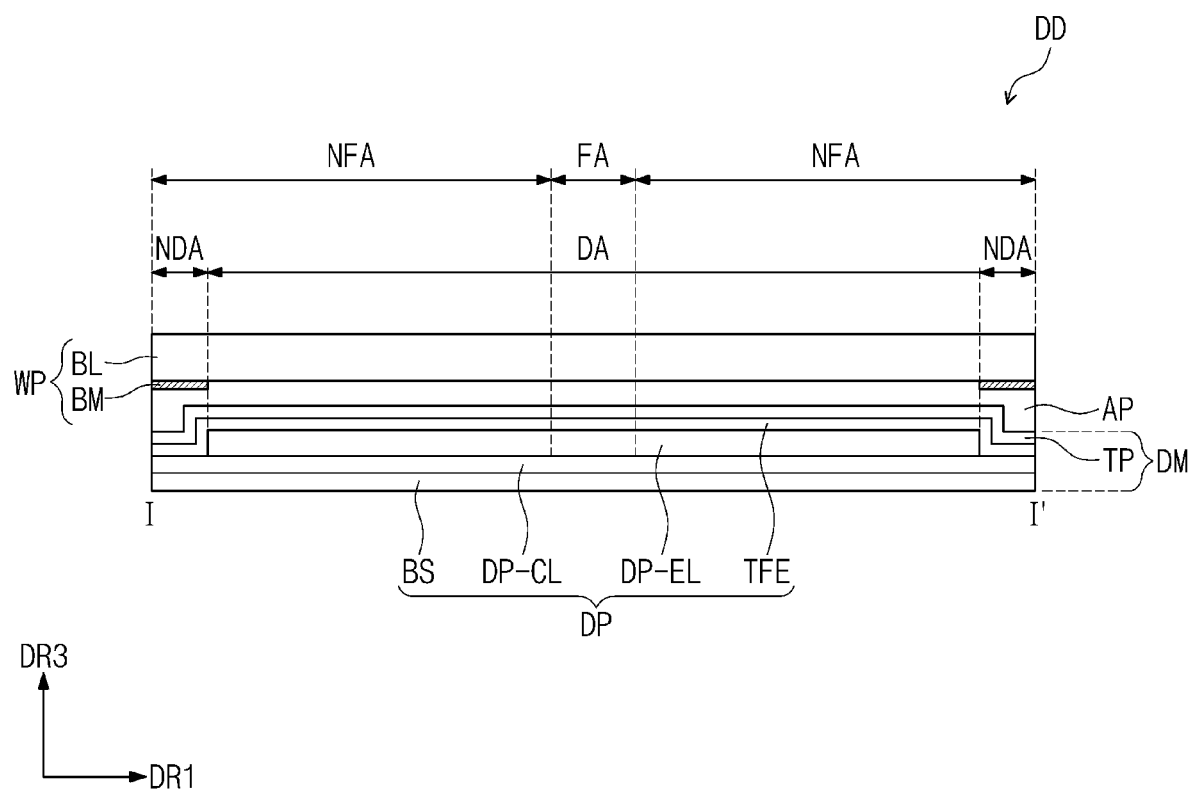
FIG. 7 is a schematic cross-sectional view of a display device according to an embodiment.

FIG. 6 is an exploded schematic perspective view of a display device DD according to an embodiment. FIG. 7 is a schematic cross-sectional view of the display device DD according to an embodiment. FIG. 7 may be a cross-sectional view of a portion taken along line I-I' of FIG. 1.

The display device DD according to an embodiment may include a display module DM and a window WP disposed on the display module DM. In the display device DD according to an embodiment, the display module DM may include a display panel DP including a display element layer DP-EL and an input sensor TP disposed on the display panel DP. The display device DD according to an embodiment may include an adhesive member AP disposed between the display panel DP and the window WP. For example, in the display device DD according to an embodiment, the adhesive member AP may be disposed between the input sensor TP and the window WP. The adhesive member AP may be an optically clear adhesive (OCA) film or an optically clear adhesive resin (OCR) layer.

The adhesive member AP may be formed from the resin composition according to an embodiment. The adhesive member AP may include a polymer derived from the resin composition of an embodiment.

The resin composition according to an embodiment may include a (meth)acrylate oligomer. In the specification, a (meth)acrylate refers to an acrylate or methacrylate. For example, the resin composition may include a urethane (meth)acrylate oligomer. In an embodiment, the urethane (meth)acrylate oligomer may include a photocurable compound including at least one (meth)acryloyl group having a urethane bond. The urethane (meth)acrylate oligomer may include at least one of acrylates having a urethane bond, a urethane acrylate having a polycarbonate skeleton, and a urethane acrylate having a polyether skeleton. For example, the resin composition of an embodiment may include, as the urethane acrylate oligomer, at least one of UF-0051 (made by Kyoeisha Chemical), UN-6305 (made by Negami Industries), and SUA008 (made by Asia Industries).

The resin composition including a (meth)acrylate oligomer may exhibit low-viscosity characteristics and may thus be applied through a method such as an inkjet printing method or a dispensing coating method. The (meth)acrylate oligomer may be included in the resin composition in an oligomer state of having a relatively high degree of polymerization, so that the (meth)acrylate oligomer may exhibit a high peel strength by maintaining a high degree of polymerization even after photocuring.

The resin composition according to an embodiment may include a (meth)acrylate oligomer and exhibit high adhesion after photocuring. Accordingly, in case that the adhesive member formed of the resin composition of an embodiment is applied to a foldable display device, the folding characteristics of the display device may be improved.

The resin composition according to an embodiment may include an oxygen inhibition preventing agent including at least one of a phosphite compound having a boiling point of about 150° C. or higher and a phosphine compound having a boiling point of about 150° C. or higher.

In the specification, the oxygen inhibition preventing agent refers to a material that may prevent oxygen inhibition, and oxygen inhibition means that the polymerization reaction may be inhibited by oxygen. For example, oxygen inhibition may indicate that peroxy radicals generated by the reaction of radicals and oxygen inhibit the polymerization reaction.

Specifically, the resin composition according to an embodiment may include the oxygen inhibition preventing agent in an amount of about 0.1 wt % or more and less than about 1 wt % with respect to the total amount of the (meth)acrylate. For example, the resin composition may include the oxygen inhibition preventing agent in an amount of about 0.1 wt % to about 0.4 wt % with respect to the total amount of the (meth)acrylate. In case that the resin composition according to an embodiment does not include the oxygen inhibition preventing agent or includes a very small amount of the oxygen inhibition preventing agent, the oxygen inhibition preventing performance may be lowered. In case that the resin composition includes about 1 wt % or more of the oxygen inhibition preventing agent, a peel strength may decrease after curing of the resin composition. In this specification, it may be understood that the total amount of the (meth)acrylate may be the sum of the total amount of the (meth)acrylate oligomers included in the resin composition and the (meth)acrylate monomers to be described later.

The resin composition of the disclosure may include the above-described oxygen inhibition preventing agent, so that the monomer may be polymerized in the atmosphere. For example, the resin composition of an embodiment may undergo photocuring through light irradiation in an atmosphere, and the degree of polymerization in the polymerization reaction may be improved in an oxygen ambient.

The boiling point of the oxygen inhibition preventing agent according to an embodiment of the disclosure may be about 150° C. or higher, for example, about 160° C. or higher. Specifically, the oxygen inhibition preventing agent may include a phosphite compound having a boiling point of about 150° C. or higher, and may include, for example, at least one of triphenyl phosphite (TPP), tri-cresyl phosphite (TCP), and triethyl phosphite (TEP).

Specifically, the oxygen inhibition preventing agent may include a phosphine compound having a boiling point of about 150° C. or higher, and may include, for example, triphenyl phosphine.

The resin composition according to an embodiment may further include other oxygen inhibition preventing agent in addition to the above-described oxygen inhibition preventing agent. For example, the resin composition may further include a thiol compound or an amine compound. The resin composition of the disclosure may further include a thiol compound or an amine compound to produce a low molecule required in a polymerization reaction.

The resin composition according to an embodiment may further include at least one of a (meth)acrylate monomer, and a photoinitiator.

For example, the resin composition of an embodiment may include a monofunctional (meth)acrylate monomer. In the resin composition of an embodiment, the monofunctional (meth)acrylate monomer may include different monomers. For example, in the resin composition of an embodiment, the monofunctional (meth)acrylate monomer may include at least one monofunctional acrylate monomer and at least one monofunctional methacrylate monomer.

The resin composition according to an embodiment may include, as a monofunctional (meth)acrylate, at least one of isodecyl acrylate, 2-methyl-2-ethyl-1,3-dioxolan-4-ylmethylacrylate, 4-hydroxy butyl acrylate, 2-ethylhexyl acrylate, and butyl acrylate.

The resin composition according to an embodiment may further include a polyfunctional (meth)acrylate monomer in case including about 80 wt % or more of a monofunctional (meth)acrylate monomer with respect to the total amount of the (meth)acrylate. For example, the resin composition according to an embodiment may include a bifunctional (meth)acrylate monomer. In the resin composition according to an embodiment, the bifunctional (meth)acrylate monomer may include different monomers. For example, in the resin composition according to an embodiment, bifunctional (meth)acrylate monomer may include at least one bifunctional acrylate monomer and at least one bifunctional methacrylate monomer.

The resin composition according to an embodiment may include, as the bifunctional (meth)acrylate monomer, 1,4-butanediol di(meth)acrylate, 1,3-butylene glycol di(meth)acrylate, 1,6-hexanediol di(meth)acrylate, 1,8-octane diol di(meth)acrylate, 1,9-octane diol diacrylate, 1,12-dodecane diol di(meth)acrylate, neopentyl glycol di(meth)acrylate, dicyclopentanyl di(meth)acrylate, cyclohexane-1,4-dimethanol di(meth)acrylate, tricyclodecane di methanol di(meth)acrylate, dicyclopentane dimethylol di(meth)acrylate, neopentyl glycol modified trimethylpropane di(meth)acrylate, adamantane di(meth)acrylate, trimethylolpropane tri(meth)acrylate or a mixture thereof. The resin composition according to an embodiment may include at least one photoinitiator. In case that multiple photoinitiators are included, different photoinitiators may be activated by ultraviolet light having different central wavelengths.

The photoinitiator may be at least one selected from among 2,2-dimethoxy-1,2-diphenyl-1-ethanone, 1-hydroxycyclohexyl-phenyl-ketone, 2-hydroxy-2-methyl-1-phenyl-1-propanone, 2-hydroxy-1-[4-(2-hydroxyethoxy)phenyl]-2-methyl-1-propanone), and 2-hydroxy-1-{4-[4-(2-hydroxy-2-methyl-propionyl)-benzyl]-phenyl}-2-methylpropan-1-one.

The photoinitiator may be at least one selected from among 2-methyl-1[4-(methylthio)phenyl]-2-morpholinopropan-1-one, 2-benzyl-2-dimethylamino-1-(4-morpholinophenyl)-1-butanone, 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino] acetate, and bis(2,4-cyclopentadienyl)bis[2,6-difluoro-3-(1-pyrryl)phenyl] titanium(IV).

The resin composition according to an embodiment may have a viscosity of about 150 mPa·s or less. The resin composition according to an embodiment may have a viscosity of about 1.0 mPa·s to about 150 mPa·s at about 20° C. to about 50° C. For example, the resin composition may have a viscosity of about 1.0 mPa·s to about 100 mPa·s, for example about 1.0 mPa·s to about 50 mPa·s, at about 25° C. The viscosity of the resin composition may be measured according to the JIS K2283 method.

In case that the viscosity of the resin composition according to an embodiment is less than about 1.0 mPa·s, the viscosity may be low, so that a resin composition solution provided to form the adhesive member flows, which makes it difficult to form a coating film having a uniform thickness by using the resin composition. In case that the viscosity of the resin composition of an embodiment exceeds about 150 mPa·s, it may be difficult to discharge the resin composition in an appropriate amount from an application device used to apply the resin composition.

The display panel DP may include a base substrate BS, a circuit layer DP-CL disposed on the base substrate BS, a display element layer DP-EL disposed on the circuit layer DP-CL, and an encapsulation layer TFE covering the display element layer DP-EL. For example, the display panel DP may include organic light emitting elements or quantum dot light emitting elements in the display element layer DP-EL.

A configuration of the display panel DP illustrated in FIG. 7 and the like is provided as an example, and the configuration of the display panel DP is not limited to that illustrated in FIG. 7 and the like. For example, the display panel DP may include a liquid crystal display element, and the encapsulation layer TFE may be omitted.

An input sensor TP may be disposed on the display panel DP. For example, the input sensor TP may be disposed on (e.g., directly disposed on) the encapsulation layer TFE of the display panel DP. The input sensor TP may detect an external input, change the detected external input to an input signal, and provide the input signal to the display panel DP. For example, in the display device DD according to an embodiment, the input sensor TP may be a touch sensor that detects a touch. The input sensor unit TP may recognize user's direct touch, user's indirect touch, object's direct touch, or object's indirect touch, and the like. The input sensor TP may detect at least one of the locations of a touch provided from the outside and the intensity (e.g., pressure) of the touch. The input sensor TP in an embodiment of the disclosure may have various structures or may be composed of various materials and is not limited to any one embodiment. The input sensing unit TP may include sensing electrodes (not shown) for sensing an external input. The sensing electrodes (not shown) may capacitively detect an external input. The display panel DP may receive the input signal from the input sensor TP and generate an image corresponding to the input signal.

The window WP may protect the display panel DP and the input sensor TP. The image IM generated by the display panel DP may pass through the window WP and be provided to the user. The window WP may provide a touch surface of the display device DD. In the display device DD including the folding region FA, the window WP may be a flexible window.

The window WP may include a base layer BL and a printing layer BM. The window WP may include a transmission region TA and a bezel region BZA. A front surface of the window WP including the transmission region TA and the bezel region BZA may correspond to a front surface of the display device DD.

The transmission region TA may be an optically transparent region. The bezel region BZA may be a region having a relatively lower light transmittance than the transmission region TA. The bezel region BZA may have a color. The bezel region BZA may be adjacent to the transmission region TA and surround the transmission region TA. The bezel region BZA may define the shape of the transmission region TA. However, embodiments of the disclosure are not limited to the illustrated one, and the bezel region BZA may be disposed adjacent to only a side of the transmission region TA, or a portion of the bezel region BZA may be omitted.

The base layer BL may be a glass or a plastic substrate. For example, a tempered glass substrate may be used for the base layer BL. In other embodiments, the base layer BL may be formed of a flexible polymer resin. For example, the base layer BL may be made of polyimide, polyacrylate, polymethylmethacrylate, polycarbonate, polyethylene naphthalate, polyvinylidene chloride, polyvinylidene difluoride, polystyrene, ethylene vinyl alcohol copolymer or a combination thereof. However, embodiments of the disclosure are not limited thereto, and the general type referred to as the base layer BL of the window WP in the relevant technical field may be used as a base layer without limitation.

The printing layer BM may be disposed on one surface of the base layer BL. In an embodiment, the printing layer BM may be provided on a lower surface of the base layer BL adjacent to the display module DM. The printing layer BM may be disposed in an edge region of the base layer BL. The printing layer BM may be an ink printing layer. The printing layer BM may be a layer including a pigment or dye. In the window WP, the bezel region BZA may be a portion provided with the printing layer BM.

The window WP may further include at least one functional layer (not shown) provided on the base layer BL. For example, the functional layer (not shown) may be a hard coating layer, an anti-fingerprint coating layer, or the like, but embodiments of the disclosure are not limited thereto.

There may be a step between a portion provided with the printing layer BM and the base layer BL not provided with the printing layer BM. The adhesive member AP of an embodiment formed from the resin composition according to the above-described embodiment may have a low storage modulus and a high adhesive force value, and may thus be attached to the window WP without being lifted at a stepped portion.

The adhesive member AP according to an embodiment may include a polymer derived from the resin composition of the above-described embodiment. For example, the adhesive member AP according to an embodiment may include a polymer which may be derived from a resin composition including a (meth)acrylate oligomer, and an oxygen inhibition preventing agent including at least one of a phosphite compound having a boiling point of about 150° C. or higher and a phosphine compound having a boiling point of about 150° C. or higher, wherein the oxygen inhibition preventing agent may be included in an amount of about 0.1 wt % or more and less than about 1 wt % with respect to the total amount of a (meth)acrylate. The adhesive member AP according to an embodiment may include a polymer derived from a resin composition further including at least one of a monofunctional (meth)acrylate monomer, a bifunctional (meth)acrylate monomer, and a photoinitiator. The same contents regarding those described in the resin composition according to the above-described embodiment may be applied to the monofunctional (meth)acrylate monomer, the bifunctional (meth)acrylate monomer, and the photoinitiator.

Since the resin composition according to an embodiment may include the above-described oxygen inhibition preventing agent, the adhesive member AP according to an embodiment may have excellent adhesion at high temperatures, and an improved peel strength. For example, the adhesive member AP may exhibit an excellent peel strength at about 60° C.

The adhesive member AP included in the display device DD according to an embodiment may be provided, in the form of a liquid resin composition, on a surface of the window WP or a surface of the display module DM, and formed by UV curing the liquid resin composition provided between the window WP and the display module DM. In other embodiments, the adhesive member AP may be provided by UV curing a liquid resin composition in a separate process to form the adhesive member AP, laminating a surface of the adhesive member AP cured in the form of an adhesive film on a surface of the window WP or on a surface of the display module DM, and attaching an unattached surface of the window WP or an unattached surface of the display module to a surface of the adhesive member AP.

The thickness of the adhesive member AP may be about 50 μm to about 200 μm. For example, the adhesive member AP may have a thickness of about 100 μm to about 150 μm.

Figure 8A:
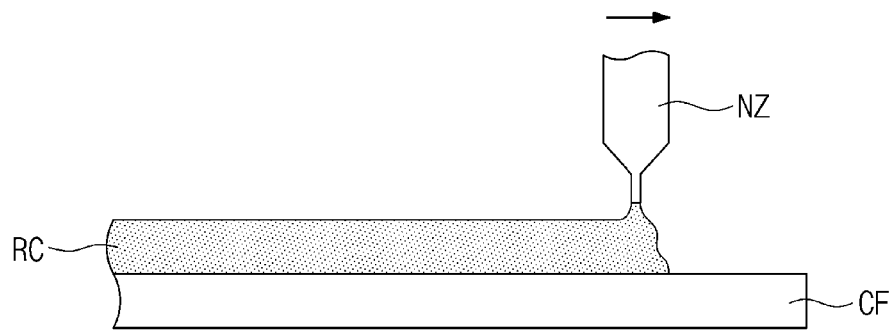
FIGS. 8A to 8C schematically illustrate a method of manufacturing an adhesive member according to an embodiment.
Figure 8B:
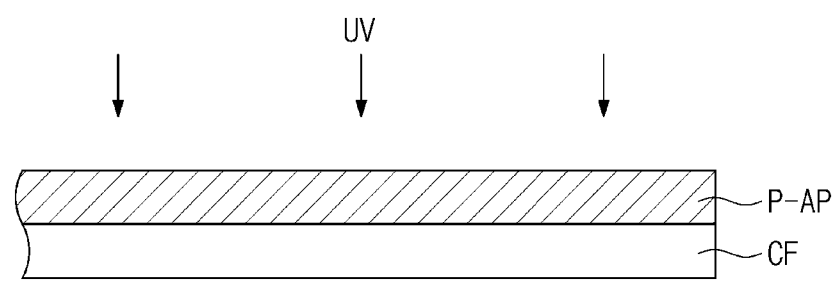
Figure 8C:
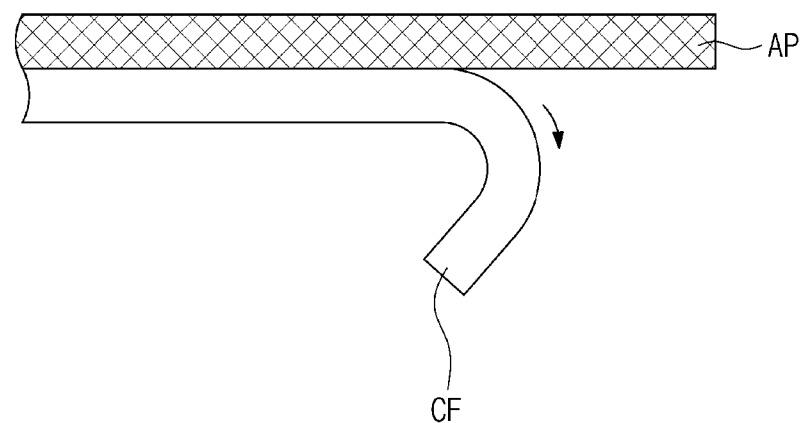

FIGS. 8A to 8C schematically illustrate a method of manufacturing an adhesive member AP according to an embodiment. FIG. 8A illustrates providing a resin composition RC to form an adhesive member AP, FIG. 8B illustrates ultraviolet light (UV) irradiation, and FIG. 8C illustrates removing a carrier film CF.

Referring to FIGS. 8A to 8C, the resin composition RC according to an embodiment may be provided on the carrier film CF. For example, a polyethylene terephthalate (PET) film, and the like may be used as the carrier film CF, but embodiments of the disclosure are not limited thereto. The carrier film CF may serve as a substrate for coating with the liquid resin composition RC and may be used without limitation as long as the carrier film may be easily detached from the adhesive member AP after UV curing. For example, a release treatment may be performed for a surface of the carrier film CF provided with the resin composition RC.

The resin composition RC may be provided through a method such as an inkjet printing method or a dispensing method. Since the resin composition RC according to an embodiment has a viscosity value of about 1.0 mPa·s to about 150 mPa·s at about 20° C. to about 50° C., the resin composition RC may be easily discharged from a nozzle NZ or the like and provided to constantly maintain a coating thickness thereof. Specifically, the resin composition RC according to an embodiment may have a viscosity value of about 1.0 mPa·s to about 50 mPa·s at about 25° C.

A preliminary adhesive member P-AP provided by applying the resin composition RC to a constant thickness may be irradiated with ultraviolet light UV. FIG. 8B illustrates that the coated preliminary adhesive member P-AP may be irradiated (e.g., directly irradiated) with ultraviolet light UV, but embodiments of the disclosure are not limited thereto. An auxiliary carrier film (not shown) may be further disposed on the preliminary adhesive member P-AP, and the auxiliary carrier film (not shown), which transmits ultraviolet light, may cover the preliminary adhesive member P-AP during a UV curing process.

The adhesive member AP may be formed after UV curing. The adhesive member AP finally provided by removing the carrier film CF used during the process may exhibit an excellent adhesion at high temperature.

The adhesive member AP manufactured in the operations of FIGS. 8A to 8C may be applied to the above-described display device DD. For example, a surface of the adhesive member AP may be attached to the display module DM, and thereafter, the window WP may be sequentially attached to another surface of the adhesive member AP facing the surface of the adhesive member AP attached to the display module DM. In other embodiments, the adhesive member AP may be provided in the display device DD such that a surface of the adhesive member AP may be attached to a surface of the window WP that may face the display module DM, and thereafter, the display module DM may be sequentially attached to another surface of the adhesive member AP facing a surface of the adhesive member AP attached to the window WP.

Figure 9A:
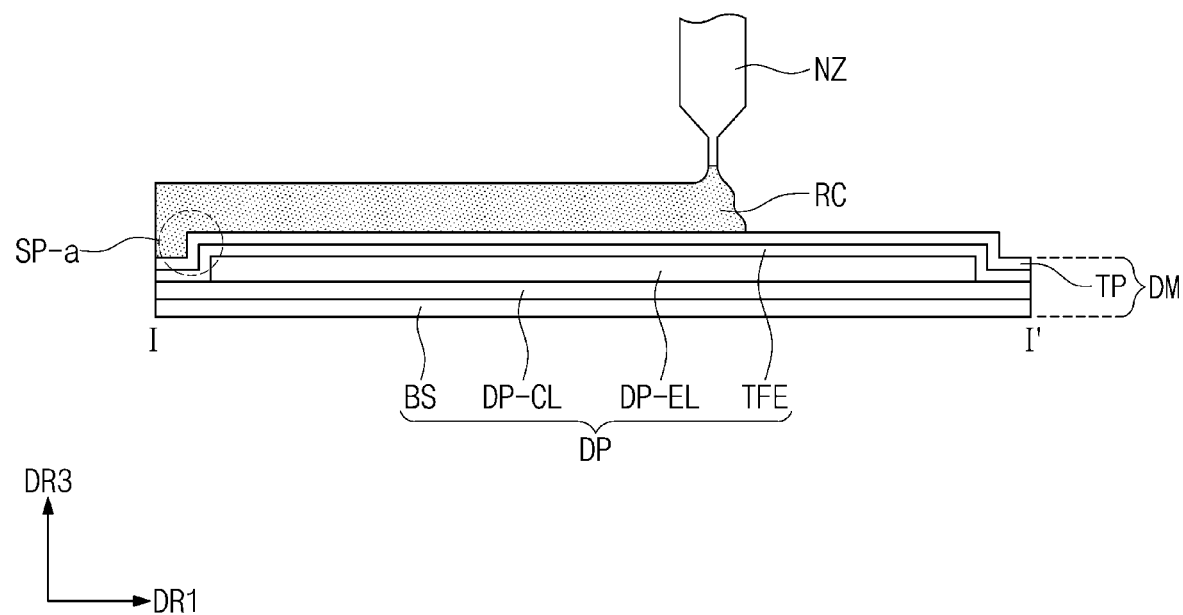
FIGS. 9A and 9B schematically illustrate a method of manufacturing an adhesive member according to an embodiment.
Figure 9B:
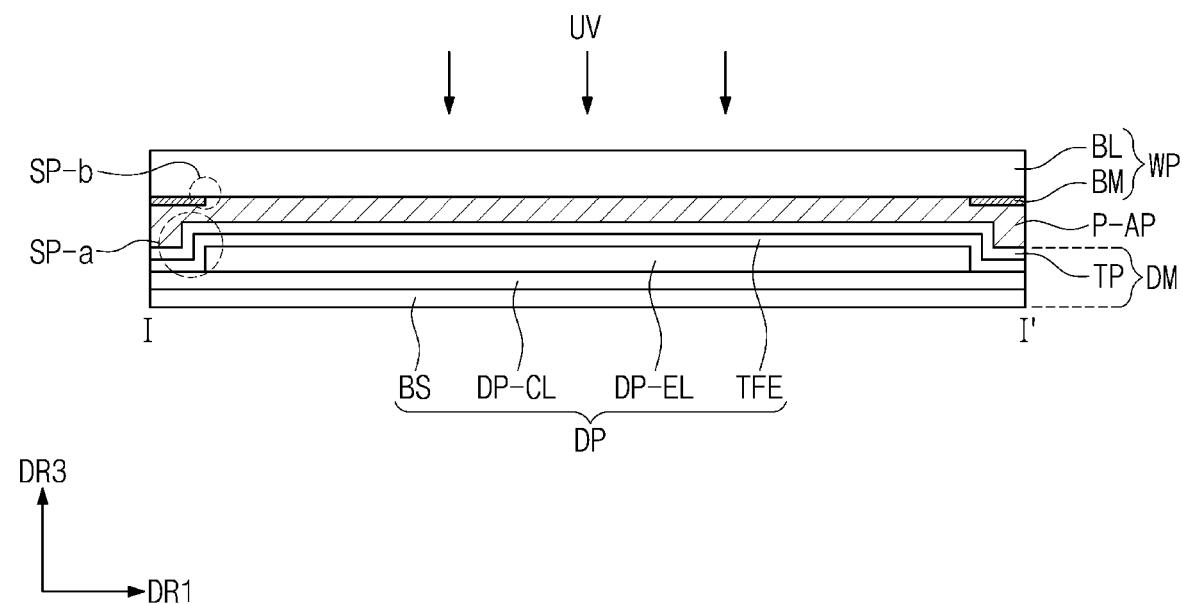

A liquid resin composition provided between the display module DM and the window WP may be cured to form an adhesive member AP. FIGS. 9A and 9B schematically illustrate a method of manufacturing the adhesive member AP which is included in the display device DD and manufactured through a method different from the manufacturing method of the adhesive member AP described with reference to FIGS. 8A to 8C.

FIG. 9A illustrates providing a resin composition RC on the display module DM. FIG. 9B illustrates an operation in which the preliminary adhesive member P-AP formed from the resin composition RC may be irradiated with ultraviolet light UV.

The resin composition RC may be provided through a method such as an inkjet printing method or a dispensing method. Since the resin composition RC according to an embodiment has a viscosity value of about 1.0 mPa·s to about 50 mPa·s at about 25° C., the resin composition RC may be easily discharged from the nozzle NZ or the like, and may be provided to maintain a coating thickness thereof constant and small. The resin composition RC may have a viscosity value of about 1.0 mPa·s to about 50 mPa·s and thus be provided while covering a bent portion of a stepped portion SP-a of the display module DM. For example, since the resin composition RC has a low-viscosity value of about 50 mPa·s or less, the resin composition RC may be filled, without a void, into a bent portion such as the stepped portion SP-a. The resin composition RC provided through the nozzle NZ may have a viscosity value of about 1.0 mPa·s or more, and may thus be uniformly coated to a thickness without flowing out of the display module DM.

The window WP may be provided on the preliminary adhesive member P-AP provided by being coated with the resin composition RC to a thickness. Ultraviolet light UV for curing the resin composition RC may be provided through the window WP. In case that the window WP is provided on the preliminary adhesive member P-AP, the resin composition RC may be filled, without a void, into a stepped portion SP-b. For example, since the resin composition RC has a low-viscosity value of about 50 mPa·s or less, the preliminary adhesive member P-AP may be provided so as to cover a bent shape in a bent portion such as a stepped portion SP-b between the base layer BL and the printing layer BM. The preliminary adhesive member P-AP may be cured with the provided ultraviolet light (UV) after polymerization and thus be formed into the adhesive member AP.

Unlike that illustrated in FIG. 9B, etc., ultraviolet light UV may be provided to the preliminary adhesive member P-AP before the window WP may be provided on the preliminary adhesive member P-AP, so that a polymerization reaction may be carried out in the resin composition RC. The irradiation amount of ultraviolet light UV may correspond to an amount of light sufficient to completely cure the resin composition RC. In other embodiments, the final adhesive member AP may be formed by partially carrying out the polymerization reaction of the resin composition RC in the state of the preliminary adhesive member P-AP, and further reacting the unreacted resin composition RC.

The display devices DD, DD-a, and DD-b according to embodiments illustrated in FIGS. 1 to 5 may each include the adhesive member AP including a polymer derived from the resin composition of the above-described embodiment and may maintain an adhesive state between the window WP and the display module DM using the adhesive member AP without lifting of the adhesive member AP even in a folded state or a bending region of the display device.

Figure 10:
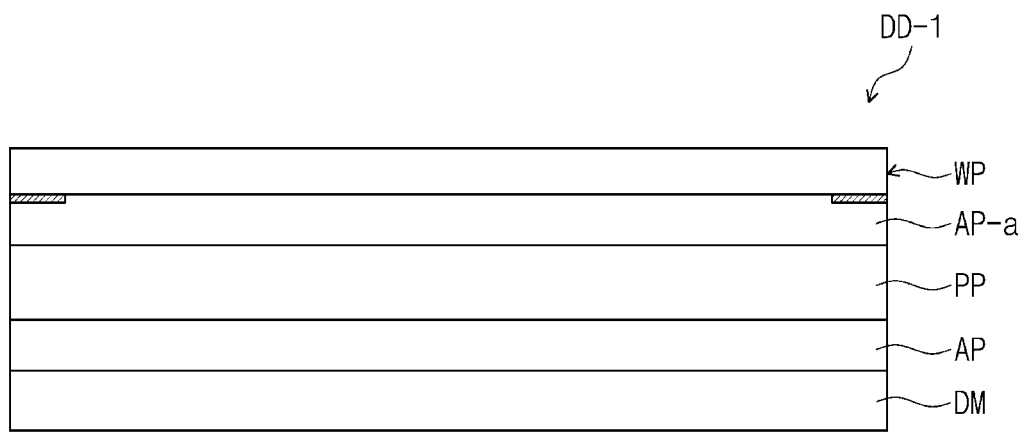
FIG. 10 is a schematic cross-sectional view of a display device according to an embodiment.

FIG. 10 is a schematic cross-sectional view illustrating a display device according to an embodiment. Hereinafter, in a display device according to an embodiment illustrated in FIG. 10, duplicate description made with reference to FIGS. 1 to 9B will not be provided again, and description will be focused on differences.

Compared to the display device DD described with reference to FIGS. 6 and 7, a display device DD-1 according to an embodiment illustrated in FIG. 10 may further include a light control layer PP and an optical adhesive layer AP-a. The display device DD-1 according to an embodiment may further include a light control layer PP disposed between the adhesive member AP and the window WP, and an optical adhesive layer AP-a disposed between the light control layer PP and the window WP.

The light control layer PP may be disposed on the display panel DP to control reflected light, by external light, at the display panel DP. The light control layer PP may include, for example, a polarizing layer or a color filter layer.

The optical adhesive layer AP-a may be an optically clear adhesive (OCA) film or an optically clear adhesive resin (OCR) layer. The optical adhesive layer AP-a may be formed from the resin composition according to an embodiment in the same manner as the adhesive member AP (see, e.g., FIG. 7) of an above-described embodiment. For example, the optical adhesive layer AP-a may include a polymer derived from a resin composition including a (meth)acrylate oligomer, and an oxygen inhibition preventing agent including at least one of a phosphite compound having a boiling point of about 150° C. or higher and a phosphine compound having a boiling point of about 150° C. or higher, wherein the oxygen inhibition preventing agent may be included in an amount of about 0.1 wt % or more and less than about 1 wt % with respect to the total amount of a (meth)acrylate.

The resin composition before a reaction caused by the photoinitiator may have a viscosity of about 1.0 mPa·s to about 150 mPa·s at about 20° C. to about 50° C. as measured according to the JIS Z8803 method.

The optical adhesive layer AP-a according to an embodiment may exhibit high adhesion.

The display device DD-1 according to an embodiment may include an optical adhesive layer AP-a and an adhesive member AP which may be formed from the resin composition according to an embodiment. The optical adhesive layer AP-a and the adhesive member AP may have high adhesion, and thus may not be lifted off at the interface therebetween even in case that the display device is folded or bent, thereby exhibiting excellent reliability characteristics.

Figure 11:
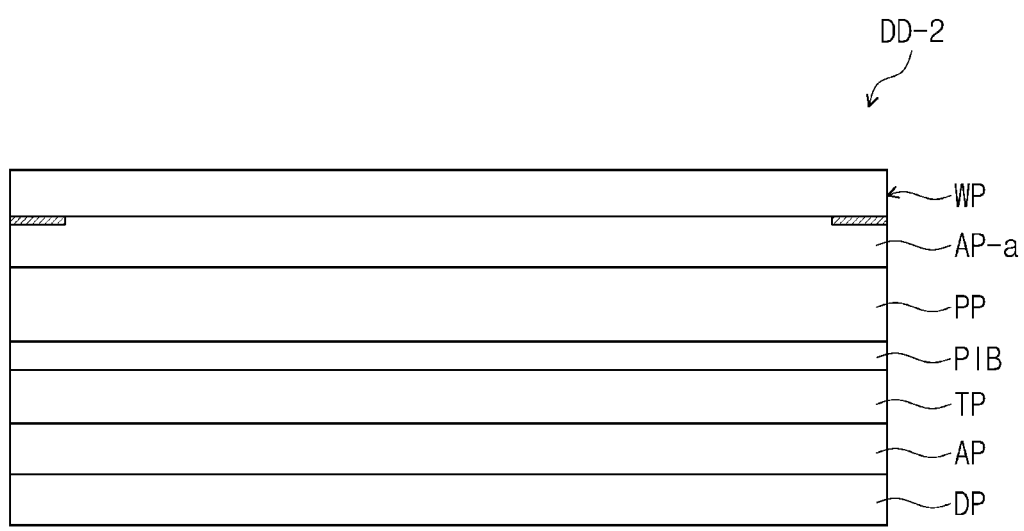
FIG. 11 is a schematic cross-sectional view of a display device according to an embodiment.

FIG. 11 is a schematic cross-sectional view illustrating a display device according to an embodiment. Hereinafter, in a display device according to an embodiment illustrated in FIG. 11, duplicate description made with reference to FIGS. 1 to 10 will not be provided again, and the description will be focused on differences.

Compared to the display device DD described with reference to FIGS. 6 and 7, a display device DD-2 according to an embodiment illustrated in FIG. 11 may further include a light control layer PP, an optical adhesive layer AP-a, and an interlayer adhesive layer PIB. Like the display device DD-1 according to an embodiment illustrated in FIG. 10, the display device DD-2 according to an embodiment may further include a light control layer PP disposed between the adhesive member AP and the window WP, and an optical adhesive layer AP-a disposed between the light control layer PP and the window WP.

The adhesive member AP according to an embodiment may be provided between the display panel DP and the input sensor TP. For example, the input sensor TP may not be disposed directly on the display panel DP, but the display panel DP and the input sensor TP may be connected to each other via the adhesive member AP. For example, the adhesive layer AP may be disposed between the encapsulation layer TFE (see, e.g., FIG. 7) of the display panel DP and the input sensor TP.

An interlayer adhesive layer PIB may be provided under the light control layer PP. The interlayer adhesive layer PIB may be disposed between the input sensor TP and the light control layer PP and may be formed of an adhesive material having excellent moisture-proofing characteristics. For example, the interlayer adhesive layer PIB may be formed by material including polyisobutylene. The interlayer adhesive layer PIB may be disposed on the input sensor TP to prevent corrosion of the sensing electrodes of the input sensor TP.

The display device DD-2 according to an embodiment may include an optical adhesive layer AP-a and an adhesive member AP which may be formed from the resin composition according to an embodiment. The optical adhesive layer AP-a and the adhesive member AP may have high adhesion, and thus may not be lifted off at the interface therebetween even in case that the display device DD-2 is folded or bent, thereby exhibiting excellent reliability characteristics.

Hereinafter, a resin composition, an adhesive member, and a display device according to embodiments of the disclosure will be described in detail with reference to Examples and Comparative Examples. Examples illustrated below are provided to assist in understanding of the disclosure, and the scope of the disclosure is not limited thereto.

1. Preparation of Curable Liquid Resin Composition

Resin compositions of Examples 1 to 8 were prepared according to mixing ratios shown in Table 1. Resin compositions of Comparative Examples 1 to 8 were prepared by the mixing ratios shown in Table 2. Constituent materials of Examples and Comparative Examples were provided to a heat-resistant light-shielding container at weight ratios disclosed in Tables 1 and 2, and Omnirad TPO-H (2,4,6-trimethylbenzoyl-diphenylphosphine oxide) was provided as a photoinitiator in an amount of about 2 wt %. Thereafter, the provided materials were stirred at about 25° C. to prepare a curable liquid resin composition.

The numerical values shown in Tables 1 and 2 represent the mixing ratio (wt %) with respect to the total amount of a (meth)acrylate. For example, numerical values in Tables 1 and 2 may be weights (wt %) represented with respect to about 100% of the sum of the total amount of oligomers and the total amount of monomers.

TABLE 1

| | | Example 1 | Example 2 | Example 3 | Example 4 | Example 5 | Example 6 | Example 7 | Example 8 |
|---|---|---|---|---|---|---|---|---|---|
| Oligomer | UFC-051 | 10 | 10 | 10 | 10 | 12 | — | — | — |
| | UN6305 | — | — | — | — | — | 7 | 7 | 7 |
| | SUA008 | — | — | — | — | — | 5 | 5 | 5 |
| Monomer | MEDOL-10 | 60 | 60 | 60 | 60 | 15 | — | — | — |
| | IDAA | 30 | 30 | 30 | 30 | 58 | — | — | — |
| | 4-HBA | — | — | — | — | 15 | 32 | 32 | 32 |
| | 2-EHA | — | — | — | — | — | 42 | 42 | 42 |
| | BA | — | — | — | — | — | 14 | 14 | 14 |
| Initiator | TPO-H | 2 | 2 | 2 | 2 | 2 | 2 | 2 | 2 |
| Oxygen inhibition preventing agent | TPP | 0.1 | 0.2 | — | — | 0.1 | 0.2 | — | — |
| | TCP | — | — | 0.2 | — | — | — | 0.2 | — |
| | TEP | — | — | — | 0.2 | — | — | — | 0.2 |
| | Do-T | — | — | — | — | — | — | — | — |
| | Di-T | — | — | — | — | — | — | — | — |
| Viscosity (mPa · s) | | 25 | 25 | 25 | — | 28 | 29 | 29 | 29 |
| Peel strength (N/mm) | 25° C. | 1.6 | 1.7 | 1.6 | 1.6 | 1.1 | 0.9 | 0.9 | 0.9 |
| | 60° C. | 0.9 | 1.0 | 0.9 | 0.8 | 0.6 | 0.5 | 0.5 | 0.5 |

TABLE 2

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Oligomer | UFC-051 | 10 | 10 | 10 | 10 | 12 | — | — | — |
| | UN6305 | — | — | — | — | — | 7 | — | — |
| | SUA008 | — | — | — | — | — | 5 | — | — |
| Monomer | MEDOL-10 | 60 | 60 | 60 | 60 | 15 | — | 100 | — |
| | IDAA | 30 | 30 | 30 | 30 | 58 | — | — | — |

TABLE 2-continued

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
|  | 4-HBA | — | — | — | — | 15 | 32 | — | — |
|  | 2-EHA | — | — | — | — | — | 42 | — | 100 |
|  | BA | — | — | — | — | — | 14 | — | — |
| Initiator | TPO-H | 2 | 2 | 2 | 2 | 2 | 2 | 2 | 2 |
| Oxygen inhibition preventing agent | TPP | — | 3.8 | — | — | — | — | — | — |
|  | TCP | — | — | — | — | — | — | — | — |
|  | Do-T | — | — | 0.2 | — | — | — | — | — |
|  | Di-T | — | — | — | 0.2 | — | — | — | — |
| Viscosity (mPa · s) |  | 25 | 25 | 25 | 25 | 28 | 29 | 6 | 6 |
| Peel strength (N/mm) | 25° C. | 1.5 | 1.2 | 1.1 | 1.0 | 1.0 | 0.8 | 0.5 | 0.1 |
|  | 60° C. | 0.7 | 0.6 | 0.3 | 0.3 | 0.4 | 0.4 | 0.1 | Not measurable |

(Material of Resin Composition)

Data on each component used in the Examples and Comparative Examples disclosed in Tables 1 and 2 may be as follows.

[Monomer]
  IDAA: isodecyl acrylate
  MEDOL-10: 2-methyl-2-ethyl-1,3-dioxolan-4-yl methyl acrylate
  4-HBA: 4-hydroxy butyl acrylate
  2-EHA: 2-ethylhexyl acrylate
  BA: butyl acrylate

[Oligomer]
  UF-0051: urethane acrylate (manufactured by Kyoeisha Chemical Co., Ltd.)
  UN-6305: urethane acrylate (manufactured by Negami Industrial Co., Ltd)
  SUA008: urethane acrylate (manufactured by Asia Industrial Co., Ltd)

[Photopolymerization Initiator]
  Omnirad TPO-H: self-cleavage type radical polymerization initiator

[Oxygen Inhibition Preventing Agent]
  TPP: triphenyl phosphite, b.p. 360° C.
  TCP: tri-cresyl phosphite, b.p. 255° C.
  TEP: triethyl phosphite, b.p. 156° C.
  Do-T: dodecanethiol
  Di-T: dithiol 1. Evaluation of Physical Properties of Resin composition and Adhesive Member formed from Resin Composition (Measurement Method)

The viscosities and the peel strengths of resin compositions of Examples and resin compositions of Comparative Examples were evaluated and shown in Tables 1 and 2. The viscosity and the peel strength of each resin composition was measured by the following method.

[Viscosity Measurement Method]

The viscosity of the resin composition described in this specification may be measured at 25° C. according to the JIS K2283 method, and measured at a speed condition of 10 rpm using a viscometer TVE-25L (TOKI Co., Ltd).

[Preparation of Cured Product Specimen]

Resin compositions of Examples 1 to 8 and Comparative Examples 1 to 8 were applied to a slide glass (manufactured by Matsunami Co., Ltd, product name S1112) such that the thickness of the resin composition was about 100 μm. Thereafter, the resin compositions were temporarily cured through irradiation in the atmosphere using about 365 nm LEDs (about 100 mW/200 mJ). Thereafter, a polyethylene terephthalate film (manufactured by Toyo Spin Co., Ltd., product name Cosmoshine 4100, width about 20 mm, length about 150 mm, thickness about 100 μm) was bonded. In a bonded state, irradiation was performed using an about 395 nm LED (about 500 mW/4000 mJ) on the side of the polyethylene terephthalate film to fully cure the resin composition, thereby obtaining a cured product.

[180° Peel Strength]

Cured products of the resin compositions of Examples 1 to 8 and Comparative Examples 1 to 8 were subjected to an about 180° peel test using a tensile tester (INSTRON 5965 type, manufactured by INSTRON Co., Ltd). The cured product was measured at about 25° C. and about 60° C. at a tensile speed of about 300 mm/min.

(Evaluation Content)

Referring to the results in Tables 1 and 2, it may be confirmed that resin compositions of Examples and Comparative Examples may each have a low viscosity of about 50 mPa·s or less. Accordingly, the resin compositions of Examples and Comparative Examples may each have low-viscosity characteristics, which makes it possible to form a thin, uniform coating film.

In the peel strength evaluation, Examples and Comparative Examples including the same oligomer and monomer were compared with each other.

The resin compositions of Examples 1 to 4 may each have more improved peel strengths at about 25° C. and about 60° C. after curing than the resin compositions of Comparative Examples 1 to 4. It is considered that this may be because the resin compositions of Examples each may include a phosphite compound in an amount of about 0.1 wt % or more and less than about 1 wt %. Referring to Comparative Examples 1 and 2, in case that the resin composition does not include a phosphite compound or includes about 1 wt % or more of a phosphite compound, the peel strength may be lowered. Referring to Comparative Examples 3 and 4, in case that the resin composition does not include the phosphite compound but includes a thiol compound such as Do-T or Di-T as an oxygen inhibition preventing agent, the peel strength may be lowered. It is considered that this may be because the thiol compound causes a chain transfer reaction to inhibit the polymerization of the resin composition.

The resin composition of Example 5 has more improved peel strengths at about 25° C. and about 60° C. after curing than the resin composition of Comparative Example 5. It is considered that this may be because the resin composition of Example 5 may include the phosphite compound in an amount of about 0.1 wt % or more and less than about 1 wt %.

The resin composition of Examples 6 to 8 has more improved peel strengths at about 25° C. and about 60° C. after curing than the resin composition of Compara- Example 6. It is considered that this may be because the resin compositions of Examples 6 to 8 each may include the phosphite compound in an amount of about 0.1 wt % or more and less than about 1 wt %.

The resin compositions of Comparative Examples 7 and 8 have a lower peel strength than the resin composition of Comparative Example 1 or were unable to be measured. It is considered that this may be because the resin compositions of Comparative Examples 7 and 8 do not include an oligomer.

The resin composition according to an embodiment may include an (meth)acrylate oligomer, a (meth)acrylate monomer, and an oxygen inhibition preventing agent, wherein the oxygen inhibition preventing agent may be included in an amount of about 0.1 wt % or more and less than about 1 wt % with respect to the total amount of a (meth)acrylate, and the oxygen inhibition preventing agent may include at least one of a phosphite compound having a boiling point of about 150° C. or higher and a phosphine compound having a boiling point of about 150° C. or higher, so that the resin composition may exhibit a high peel strength after curing.

2. Evaluation of Characteristics of Oxygen Inhibition Preventing Agent

In the following, the oxygen inhibition preventing characteristics of a phosphite compound and a thiol compound were evaluated.

(Preparation of Composition)

Compositions of Example A, Example B, Comparative Example A-1, Comparative Example A-2, Comparative Example B-1, and Comparative Example B-2 may be prepared according to the mixing ratios shown in Table 3 below.

For example, to MEDOL-10 or IDAA which may be a monofunctional monomer that does not cause a crosslinking reaction 2 mol % of 2,4,6-trimethylbenzoyl-diphenylphosphine oxide (Omnirad TPO-H) may be provided as a photoinitiator, and 0.5 mol % of triphenyl phosphite or dodecanethiol may be provided as an oxygen inhibitor.

(Preparation of Cured Product)

Compositions of Examples and Comparative Examples were applied onto a slide glass, and temporary-curing (about LED365 nm/100 mW/100 mJ) was performed in the presence of oxygen. Thereafter, the polyethylene terephthalate film was bonded and main-curing (about LED395 nm/500 mW/4000 mJ) was performed to obtain a cured product.

The obtained cured product was dissolved in tetrahydrofuran (THF), and the resultant solution was measured through gel permeation chromatography (GPC) to obtain the molecular weight of the cured product in terms of polystyrene.

In the results of Table 3, Example A, Comparative Example A-1, and Comparative Example A-2 were compared with each other, and Example B, Comparative Example B-1, and Comparative Example B-2 were compared with each other. A cured product of Example A has a more increased molecular weight than a cured product of Comparative Example A-1. A cured product of Comparative Example A-2 has a lower molecular weight than a cured product of Comparative Example A-1.

A cured product of Example B may have a more increased molecular weight than a cured product of Comparative Example B-1. A cured product of Comparative Example B-2 may have a lower molecular weight than a cured product of Comparative Example B-1.

Through the results above, it may be confirmed that the cured products of Examples A and B including TPP each have a higher molecular weight than the cured products of Comparative Examples A-1 and B-1 in which an oxygen inhibition preventing agent may not be added, and the cured products of Comparative Examples A-2 and B-2 including Do-T each have a lower molecular weight than the cured products of Comparative Examples A-1 and B-1 in which an oxygen inhibition preventing agent may not be added.

It is considered that this may be because TPP and Do-T differ from each other in reactivity with respect to the reaction stop terminal formed by oxygen. In particular, it was confirmed that a thiol compound such as Do-T causes a chain transfer reaction, thereby making it difficult to increase the molecular weight of a polymer in an oxygen ambient, but that a phosphite compound such as TPP may be effective in increasing the molecular weight of a polymer in an oxygen ambient.

The results above may demonstrate that the resin composition according to an embodiment may include a phosphite compound in an amount of about 0.1 wt % or more and less than about 1 wt %, and thus has an improved degree of polymerization in an oxygen ambient.

The resin composition according to an embodiment may include a (meth)acrylate oligomer, a (meth)acrylate monomer and an oxygen inhibition preventing agent, wherein the oxygen inhibition preventing agent may be included in an amount of about 0.1 wt % or more and less than about 1 wt % with respect to the total amount of a (meth)acrylate, and the oxygen inhibition preventing agent may include at least one of a phosphite compound having a boiling point of about 150° C. or higher and a phosphine compound having a boiling point of about 150° C. or higher, so that polymerization characteristics of the resin composition may be improved. The resin composition according to an embodiment exhibits low-viscosity characteristics and has advan-

TABLE 3

| | | Example A | Comparative Example A-1 | Comparative Example A-2 | Example B | Comparative Example B-1 | Comparative Example B-2 |
| --- | --- | --- | --- | --- | --- | --- | --- |
| Monomer (Added amount mol %) | | MEDOL-10(0.5) | | | IDAA2(0.5) | | |
| Initiator (Added amount mol %) | | TPO-H(2) | | | | | |
| Oxygen inhibition preventing agent (added amount mol %) | TPP | 0.5 | — | — | 0.5 | — | — |
| | Do-T | — | — | 0.5 | — | — | 0.5 |
| Molecular weight (Mn) | | $10.6 \times 10^4$ | $8.8 \times 10^4$ | $2.3 \times 10^4$ | $3.4 \times 10^4$ | $3.1 \times 10^4$ | $1.4 \times 10^4$ | tageous characteristics in forming a thin, uniform coating film. The resin composition has low-viscosity characteristics, thereby exhibiting excellent coating characteristics even on curved surfaces.

The adhesive member according to an embodiment formed from the resin composition according to an embodiment may exhibit excellent peel strengths in the range of room temperature (e.g., about 25° C.) and high temperature (e.g., about 60° C.).

The display device according to an embodiment may include an adhesive member formed through the resin composition according to an embodiment and thus exhibits good reliability because there may be no peeling or lifting of the adhesive member in the bent portion. Furthermore, the display device may also exhibit excellent reliability because peeling between the adhesive member and neighboring members does not occur even in a bending or folding operation state.

A resin composition according to an embodiment may have improved polymerization characteristics.

An adhesive member according to an embodiment may have an excellent adhesion at high temperature.

A display device according to an embodiment may exhibit excellent reliability.

Although the embodiments of the disclosure have been described, it is understood that the disclosure should not be limited to these embodiments, but various changes and modifications can be made by one of ordinary skill in the art within the spirit and scope of the disclosure.

Accordingly, the technical scope of the disclosure is not limited to the content described in the detailed description of the specification but should be defined by the claims including equivalents thereof.

What is claimed is:

1. A resin composition comprising:
   a (meth)acrylate oligomer;
   a monofunctional (meth)acrylate monomer; and
   an oxygen inhibition preventing agent including at least one of:
      a phosphite compound having a boiling point of about 150° C. or higher; and
      a phosphine compound having a boiling point of about 150° C. or higher, wherein
   the monofunctional (meth)acrylate monomer includes two or more selected from isodecyl acrylate, 2-methyl-2-ethyl-1.3-dioxolan-4-ylmethylacrylate, 4-hydroxy butyl acrylate, 2-ethylhexyl acrylate and butyl acrylate, and
   the oxygen inhibition preventing agent is included in an amount of about 0.1 wt % or more and less than about 1 wt % with respect to a total amount of a (meth)acrylate.

2. The resin composition of claim 1, wherein the oxygen inhibition preventing agent comprises at least one of:
   triphenyl phosphite;
   tricresyl phosphite;
   triethyl phosphite; and
   triphenyl phosphine.

3. The resin composition of claim 1, further comprising a polyfunctional (meth)acrylate monomer in case that an amount of the monofunctional (meth)acrylate monomer is about 80 wt % or more with respect to the total amount of (meth)acrylate.

4. The resin composition of claim 1, wherein an amount of the oxygen inhibition preventing agent is about 0.1 wt % or more and less than about 0.5 wt % with respect to the total amount of the (meth)acrylate.

5. The resin composition of claim 1, further comprising:
   a thiol compound; and
   an amine compound.

6. The resin composition of claim 1, wherein the (meth)acrylate oligomer is a urethane (meth)acrylate oligomer.

* * * * *